J. HORTON.
Extension Slide for Gas Fixtures.
No. 91,443.  Patented June 15, 1869.
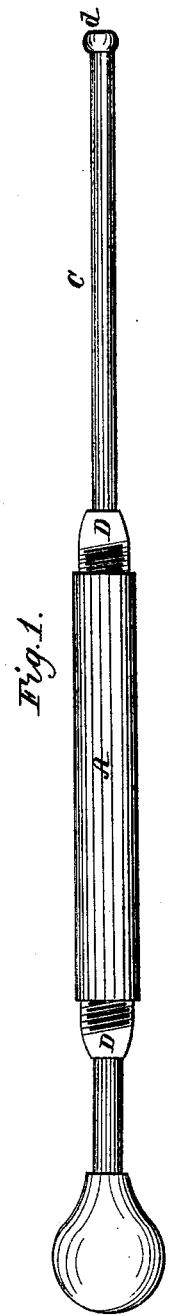
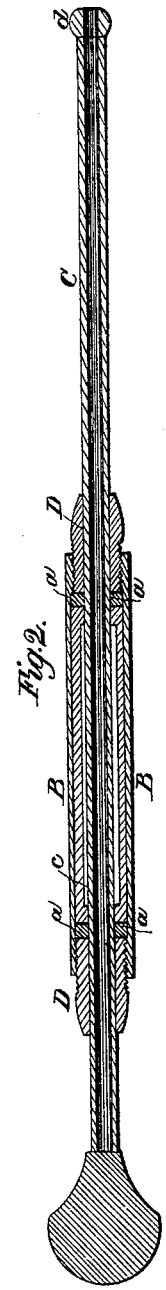

UNITED STATES PATENT OFFICE.

JOHN HORTON, OF NEW YORK, N. Y.

IMPROVEMENT IN EXTENSION-SLIDE FOR GAS-FIXTURES.

Specification forming part of Letters Patent No. 91,443, dated June 15, 1869.

*To all whom it may concern:*

Be it known that I, JOHN HORTON, of the city, county, and State of New York, have invented a new and Improved Extension-Slide for Gas-Fixtures, &c.; and that the following description, taken in connection with the accompanying drawings hereinafter referred to, forms a full and exact specification of the same, wherein I have set forth the nature and priciples of my said improvement, by which my invention may be distinguished from all others of a similar class, together with such parts as I claim and desire to have secured to me by Letters Patent.

The object of this invention is to construct an extension-slide for gas-fixtures or droplights in such manner as shall overcome all the objections so well known to exist in extension-slides as they are now made. By my invention I produce an extension or slide that cannot leak, will not stick or gum, requires but little exertion to operate it, and yet is cheaply manufactured and with facility applied.

The nature of my invention is clearly illustrated by the accompanying drawings, where—

Figure 1 is a side view of my extension-slide; and Fig. 2, a longitudinal section of the same, taken in the plane of the line $x\ x$.

Similar letters of reference indicate corresponding parts in the several drawings.

To enable others skilled in the art to make and use my invention, I describe it as follows:

A represents a hollow cylinder of brass or other suitable material, of such diameter and length as may be convenient, and in proportion to the gas-fixture for which it is designed. B is a hollow cylinder, of less diameter and length than the first-mentioned cylinder, A, and so proportioned as to readily pass into it.

From one side of the cylinder B is cut a slot, in width equal to about one-fourth its diameter, and extending to near its ends.

After the inner cylinder, B, is inserted into the interior of the cylinder A, and in order to make the slide gas-tight, I fill the inner cylinder, B, with oil or other oleaginous substance, which, flowing through the slot $c$, also fills the space between the outer and inner cylinders, thus effectually preventing the escape of the gas, and at the same time fully lubricating the stem or pipe C, so that its gumming or sticking is rendered impossible.

Leather washers or disks $a\ a$, cut to the proper size, are then inserted into the cylinder A until they abut against the ends of the inner cylinder, B, where they are tightly confined and jammed by the screw-plugs D D, screwed into the ends of the cylinder A, thus making a tight joint, and preventing the escape of the oil from and around the inner cylinder B, where it is in this manner confined The screw-plugs D D are made hollow, and holes are punched through the center of the washers or disks $a\ a$ to admit the stem or pipe C, sliding or passing through them when the same is in use.

To prevent the pipe or stem C being drawn entirely through the cylinders, a collar, $d$, is fitted at its upper end.

The screw-plugs D D extend or project beyond the ends of the outer cylinder, A, and upon these projections are cut threads, so that the gas-pipe may be screwed to the one and the chandelier to the other.

If, after long use, it should be found that the stem or pipe C works too freely through the cylinders, it can easily be remedied by giving an additional turn or two to the plugs D D, which will jam the leather washers $a\ a$ in closer contact with the stem or pipe C, thus correcting an evil long complained of in gas-slides or extensions.

Having thus described my invention, what I claim as new, and desire to secure by Letters Patent, is—

A gas-slide or extension-joint composed of the outer cylinder A, inner cylinder, B, slot $c$, washers $a\ a$, screw-plugs D D, and stem or pipe C, when used in combination with oil or other oleaginous substance, as and for the purposes hereinbefore described.

JOHN HORTON.

Witnesses:
H. L. WATTENBERG,
G. M. PLYMPTON.